United States Patent
Lavoie

(10) Patent No.: US 9,500,565 B2
(45) Date of Patent: Nov. 22, 2016

(54) VEHICLE AND METHOD OF USING A SPARE TIRE

(71) Applicant: FORD GLOBAL TECHNOLOGIES, LLC, Dearborn, MI (US)

(72) Inventor: Erick Michael Lavoie, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 105 days.

(21) Appl. No.: 14/667,153

(22) Filed: Mar. 24, 2015

(65) Prior Publication Data

US 2016/0282226 A1   Sep. 29, 2016

(51) Int. Cl.
G01M 17/00 (2006.01)
G01M 17/02 (2006.01)
B60C 99/00 (2006.01)

(52) U.S. Cl.
CPC .............. G01M 17/02 (2013.01); B60C 99/00 (2013.01)

(58) Field of Classification Search
None
See application file for complete search history.

(56) References Cited

U.S. PATENT DOCUMENTS

| | | | |
|---|---|---|---|
| 6,784,794 B1 | 8/2004 | McQuade et al. | |
| 6,850,155 B1 | 2/2005 | McQuade et al. | |
| 6,900,725 B1 | 5/2005 | Berry et al. | |
| 7,528,707 B1 | 5/2009 | Wallace | |
| 7,576,640 B2 | 8/2009 | Bothe, Jr. | |
| 2005/0160804 A1* | 7/2005 | Brown | B60C 23/06 73/146 |
| 2005/0258952 A1* | 11/2005 | Utter | B60C 23/0416 340/447 |
| 2006/0001533 A1 | 1/2006 | Bessho et al. | |
| 2008/0111671 A1* | 5/2008 | Bothe | B60C 23/0408 340/438 |
| 2016/0059859 A1* | 3/2016 | Ye | B60W 30/18172 701/75 |

OTHER PUBLICATIONS

Toyota TPMS—Toyota TPMS Tools & Tire Pressure Monitoring Systems, Dec. 1, 2014, 3 pages, Bartec USA LLC 2014, http://www.toyotatpms.com.

Jeep Grand Cherokee WK Series: 2005-2010—Tire Pressure Monitor System, Dec. 1, 2014, 14 pages, http://www.wkjeeps.com/wk_tpms.htm.

* cited by examiner

*Primary Examiner* — Andre Allen

(74) *Attorney, Agent, or Firm* — Frank MacKenzie; Brooks Kushman P.C.

(57) ABSTRACT

A spare tire monitoring system is provided. The spare tire monitoring system includes a controller programmed to output a signal indicating that a spare tire is currently being used in response to a difference between a radius of a first tire and a radius of a second tire exceeding a threshold.

20 Claims, 2 Drawing Sheets

VEHICLE AND METHOD OF USING A SPARE TIRE

TECHNICAL FIELD

The present disclosure relates to the monitoring of vehicle tires.

BACKGROUND

Vehicles may include systems that monitor the conditions of the vehicle tires including vehicle spare tires.

SUMMARY

A vehicle is provided. The vehicle includes a plurality of tires, a spare tire, and a controller programmed to output a signal indicating that the spare tire has replaced one of the plurality of tires in response to a difference between a radius of a first tire and a radius of a second tire exceeding a threshold.

A spare tire monitoring system is provided. The spare tire monitoring system includes a controller programmed to output a signal indicating that a spare tire is currently being used in response to a difference between a parameter indicative of a geometry of a first tire and a parameter indicative of a geometry of a second tire exceeding a threshold.

A method of monitoring spare tire use in a vehicle is provided. The method includes communicating to a user that a spare tire is currently in use and displaying a remaining usage life of the spare tire in response to a difference between a radius of a first tire and a radius of a second tire exceeding a threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
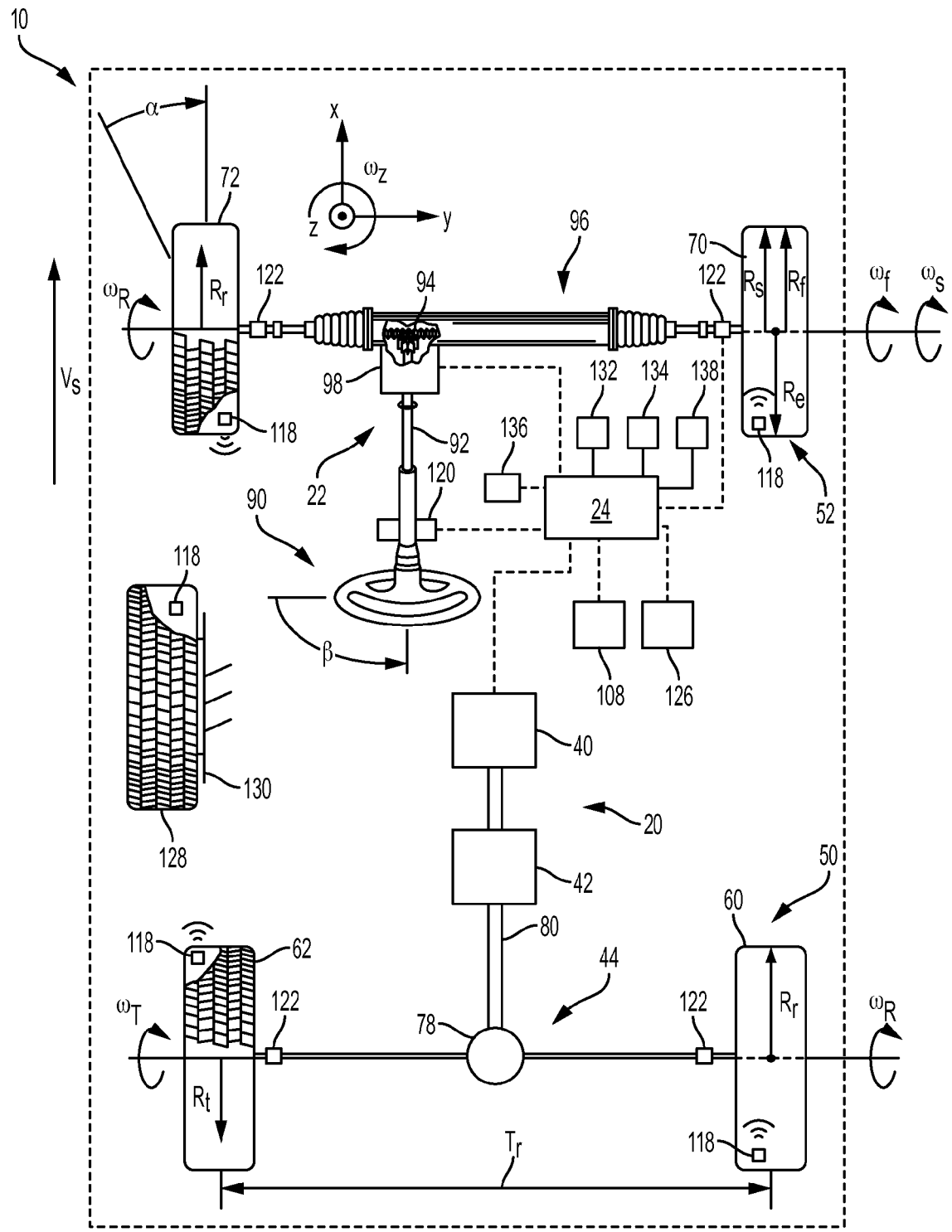
FIG. 1 illustrates a vehicle including a powertrain and steering system.

Referring to FIG. 1, a vehicle 10 is illustrated. The vehicle 10 may be a motor vehicle such as an automobile, a truck, farm equipment, or military transport vehicle. The vehicle 10 may include a powertrain 20, a steering system 22, and a controller 24.

While illustrated as one controller, the controller 24 may be part of a larger control system and may be controlled by various other controllers throughout the vehicle 10, such as a vehicle system controller (VSC). It should therefore be understood that the controller 24 and one or more other controllers can collectively be referred to as a "controller" that controls various functions of the vehicle 10 and/or actuators in response to signals from various sensors. Controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The powertrain 20 may provide torque to one or more wheel assemblies to propel the vehicle 10. The powertrain 20 may have a hybrid configuration that may employ multiple power sources or a non-hybrid configuration. In a non-hybrid configuration the powertrain 20 may include an engine 40, a transmission 42, and at least one drive axle assembly 44.

The engine 40 may be configured as an internal combustion engine that may be adapted to operate using any suitable type of fuel, such as gasoline, diesel, ethanol, hydrogen, etc. The engine 40 may provide power or a propulsive torque that may be used to rotate one or more wheel assemblies to propel the vehicle 10. For example, the vehicle 10 may have a first wheel assembly 50 and a second wheel assembly 52 longitudinally spaced apart from the first wheel assembly 50. Commonly the first wheel assembly 50 may be referred to as a rear axle and the second wheel assembly 52 may be referred to as a front axle.

The first wheel assembly 50 may include a first tire 60 mounted on a first wheel. The first wheel assembly 50 may include a second tire 62 mounted on a second wheel laterally spaced apart from the first tire 60 mounted on the first wheel. The combination of the first tire 60 and the first wheel may be rotatably mounted to a vehicle chassis by a wheel hub assembly. The combination of the second tire 62 and the second wheel may also be rotatably mounted to a vehicle chassis by a wheel hub assembly.

The second wheel assembly 52 may include a first tire 70 mounted on a first wheel. The second wheel assembly 52 may include a second tire 72 mounted on a second wheel laterally spaced apart from the first tire 70. The combination of the first tire 70 and the first wheel may be rotatably mounted to a vehicle chassis by a wheel hub assembly. The combination of the second tire 72 and the second wheel may also be rotatably mounted to a vehicle chassis by a wheel hub assembly.

The transmission 42 may be coupled or drivably connected to the engine 40. The transmission 42 may be of any suitable type such as an automatic or manual multi-gear or step ratio transmission. As used herein, the term transmission may include a transfer case or differential 78. The differential 78 may provide multi-wheel drive, all-wheel drive, front wheel drive, or rear wheel drive capability.

The drive axle assembly 44 may rotatably support the first wheel assembly 50. An output of the transmission 42 may be connected to an input of the differential 78 operably connected to the drive axle assembly 44 with a driveshaft 80. In at least one embodiment, the vehicle 10 may be provided with a forward drive axle assembly that may rotatably support the second wheel assembly 52.

The steering system 22 may be configured to articulate or pivot the second wheel assembly 52. The steering system 22 may include a steering wheel 90 in rotatable connection with the second wheel assembly 52 through a steering linkage 92. The steering linkage 92 may be configured to pivot the first wheel and the second wheel of the second wheel assembly 52 about a kingpin axis to vary a pivotal position of the wheels of the second wheel assembly 52.

The steering linkage 92 may be coupled with a steering gearbox 94. The steering gearbox 94 may be coupled with a steering mechanism 96. The steering mechanism may be connected to the first and second wheels of the second wheel assembly 52. The steering mechanism 96 may be configured to pivot or articulate the first wheel and the second wheel of the second wheel assembly 52 about the kingpin axis responsive to the rotation of the steering wheel 90. The steering mechanism 96 may be a rack and pinion steering mechanism, a recirculating ball steering mechanism, a worm and sector steering mechanism, variable ratio steering mechanism, electric power assisted steering, or other configuration that may pivot or articulate vehicle wheels. The pivotal position of the second wheel assembly 52 may be shown as a wheel angle position $\alpha$ and the corresponding rotational position of the steering wheel 90 may be shown as a steering wheel angle position $\beta$.

A power steering motor 98 may be coupled with the steering linkage 92 and/or the steering gearbox 94. The power steering motor 98 may be configured to impart motion or apply torque to the steering system 22 to turn the second wheel assembly 52. The power steering motor 98 may be an electronic power assist motor configured to provide assistance to aid the driver in turning the second wheel assembly 52 responsive to the turning of the steering wheel 90.

The powertrain 20 and the steering system 22 may be in communication with the controller 24. The controller 24 may be in communication with a plurality of vehicle sensors. The plurality of vehicle sensors may include a steering sensor 120, tire pressure sensors 118, and wheel speed sensors 122. The controller 24 may be in communication with the plurality of sensors via wired connections, wireless connections or may be in communication with the plurality of sensors through a CAN BUS Network.

The steering sensor 120 may be configured as a steering wheel angle sensor. The steering sensor 120 may be disposed proximate the steering wheel 90 or maybe disposed proximate the steering gearbox 94 or the steering mechanism 96. The steering sensor 120 may be configured to provide data indicative of steering wheel 90 rotation such as the steering wheel angle position $\beta$.

The tire pressure sensors 118 may be disposed internally or proximate the vehicle tires 60, 62, 70, and 72. A tire pressure sensor 118 may also be disposed internally or proximate of a vehicle spare tire 128. The vehicle spare tire 128 may attached to the vehicle at any rigid location 130, including a body or frame of the vehicle 10. The spare tire is configured to replace any of the vehicle tires 60, 62, 70, or 72 in the event one of the vehicle tires experiencing a failure. The spare tire 128 may have a tire geometry (e.g., radius, diameter, circumference, width) that is smaller than the other vehicle tires 60, 62, 70, and 72. The tire pressure sensors 118 may communicate with the controller 24 indicating the pressure status of each of the vehicle tires 60, 62, 70, and 72, including the spare tire 128. The tire pressure sensors 118 may also communicate with the controller 24 to indicate if the spare tire 128 has replaced any of the other vehicle tires 60, 62, 70, or 72. Communication between the tire pressure sensors 118 and the controller 24 may be conducted via wireless communication.

The wheel speed sensors 122 may be disposed proximate the vehicle wheels. For example, a wheel speed sensor 122 may be disposed proximate the first tire 60 and the second tire 62 of the first wheel assembly 50. A wheel speed sensor 122 may also be disposed proximate the first tire 70 and the second tire 72 of the second wheel assembly 52. The wheel speed sensor 122 may be configured to provide a rotational speed or angular velocity of the tire and respective wheel.

Changes in tire radius may result from tire wear, changes in tire air pressure, replacement of a tire with a spare tire, tire defects, or other issues that may affect tire radius. Several methods including yaw rate sensing, relative learning, and GPS learning may be used to determine or estimate changes in tire radius. The methods may be employed individually, in parallel, or sequentially and iteratively to provide an accurate estimate of tire radii or tire circumference during a drive cycle, compare the estimate of the tire radii or circumference during the current drive cycle and compare it to the tire radii or circumference from a preceding drive cycle, and update the controller 24 with the current radii or circumference information from the current drive cycle.

The yaw rate sensing method may be configured to calculate a reference tire radius, Rr. The reference tire radius, Rr, may be the radius of at least one of the tires associated with the first wheel assembly 50 and the second wheel assembly 52. For example, the reference tire radius, Rr, may be the radius of the first tire 60 of the first wheel assembly 50 or the radius of the first tire 70 of the second wheel assembly 52. The reference tire radius, Rr, may be based on changes from an initial tire radius or default tire radius learned from a previous drive cycle stored in memory.

The yaw rate sensing method may then learn the radius of a tire laterally spaced apart from the reference tire disposed proximate the same axle during the current drive cycle. The yaw rate sensing method may then learn the remainder of the vehicle's tire radii via the relative learning method.

The yaw rate sensing method may be configured to relate a vehicle yaw rate, $\omega_z$, the reference tire speed, a tire speed of a tire spaced apart from the reference tire, and vehicle track width, Tr, to estimate the reference tire radius, Rr. The vehicle yaw rate, $\omega_z$, may be provided to the controller 24 by another vehicle controller or stand-alone yaw rate sensor 126.

The reference tire speed or angular velocity may be provided by a wheel speed sensor 122 disposed proximate the reference tire. The tire speed or angular velocity of a tire spaced apart from the reference tire may be provided by a wheel speed sensor 122 disposed proximate the tire space apart from the reference tire. For example, the tire spaced apart from the reference tire may be the second tire 62 of the first wheel assembly 50, if the reference tire is the first tire 60 of the first wheel assembly 50, or may be one of the first tire 70 or the second tire 72 of the second wheel assembly 52 if the corresponding tire on the second wheel assembly 52 is the reference tire.

The vehicle track width, Tr, may be a lateral distance between a centerline of the first tire 60 of the first wheel assembly 50 and the second tire 62 of the first wheel assembly 50. The vehicle track width, Tr, may be a lateral distance between a centerline of the first tire 70 of the second wheel assembly 52 and the second tire 72 of the second wheel assembly 52. The vehicle track width, Tr, may be a predetermined value programmed into the controller 24. In at least one embodiment, the vehicle track width, Tr, may be a vehicle half-track width, HTr. As the name implies the vehicle half-track width, HTr, may be one half of the vehicle track width, Tr.

The yaw rate sensing method may be employed responsive to the satisfaction of screening conditions. The screening conditions that may be met prior to employing the yaw rate sensing method may include a steering angle provided by the steering sensor 120 being greater than a threshold steering angle, a vehicle speed, Vs, being less than a threshold vehicle speed, or a vehicle yaw rate, $\omega_z$, being greater than a threshold vehicle yaw rate. The screening conditions may be implemented to minimize errors in the tire radius learning methods. The controller 24 may receive the reference tire radius, Rr, based on a measured steering angle, a vehicle yaw rate, $\omega_z$, a reference tire angular velocity, $\omega_R$, and an angular velocity of the tire that is laterally spaced apart from and disposed on the same axle as the reference tire, $\omega_T$.

The yaw rate sensing method may calculate the reference tire radius, Rr, based on Equation (1):

$$Rr = \frac{\omega z \cdot (2 \cdot HTr)}{\omega R - \gamma \cdot \omega T} \quad (1)$$

The yaw rate sensing method then may be used calculate the radius of the tire that is laterally spaced apart from and disposed on the same axle as the reference tire, Rt, based on equation (2):

$$Rt = \frac{Rr \cdot \omega R - \omega z \cdot (2 \cdot HTr)}{\omega T} \quad (2)$$

$\gamma$ may be a learned radius ratio, Rt/Rr learned during straight driving by the relative learning method. Instantaneous values of the reference tire radius, Rr, may be summed up and averaged. A final reference tire radius, Rr, may be updated periodically during the drive cycle. The relative learning method may be configured to calculate a first tire radius estimate, Rf. The controller 24 may be configured to employ the relative learning method responsive to the vehicle 10 driving approximately in a straight line. The screening conditions that may be met prior to employing the relative learning method may include a steering angle provided by the steering sensor 120 being less than a threshold steering angle and a vehicle speed, Vs, being greater than a threshold vehicle speed. The screening conditions may confirm that the vehicle is driving approximately straight with a low amount of wheel slip. The controller 24 may receive the first tire radius estimate, Rf, based on the reference tire radius, Rr, or based on the reference tire angular velocity, $\omega_R$, and the first tire angular velocity, $\omega_F$. The reference tire speed or angular velocity may be provided by the wheel speed sensor 122 disposed proximate the reference tire. The first tire speed or angular velocity may be provided by the wheel speed sensor 122 disposed proximate the first tire.

The relative learning method may calculate a percent difference in size of a first tire radius, Rf, relative to the reference tire radius, Rr, during the current drive cycle. The relative learning method may calculate the percent difference in size based on Equation (3):

$$\% \text{ Difference} = \frac{\omega R - \omega F}{\omega F} \quad (3)$$

The instantaneous results of the percent difference in size may be summed up and averaged or filtered. A final value of the percent difference in size may be updated periodically during a drive cycle. The relative learning method may then determine the first tire radius, Rf, based on the percent difference. The learned radius ratio, $\gamma$, may be calculated as a ratio between the first tire radius, Rf, which may be reference tire, and the reference tire radius, Rr. The learned radius ratio, $\gamma$, may then be fed back into the yaw rate sensing method, if the reference tire radius, Rr, and the first tire radius, Rf, are tires that are laterally spaced apart from each other and disposed on the same axle.

Any of the vehicle tires may be designated the reference tire utilizing the relative learning method. The relative learning method may then be utilized to determine the radius of any of the remaining tires that are not designated the reference tire, regardless if they are on the same wheel assembly as the reference tire.

The GPS learning method may be configured to calculate a second tire radius estimate, Rs, during the current drive cycle. The GPS learning method may be employed responsive to the satisfaction of screening conditions. The screening conditions that may be met prior to employing the GPS learning method may include a vehicle speed, Vs, being greater than a threshold vehicle speed, a steering angle being less than a threshold steering angle, a vehicle acceleration being less than a threshold vehicle acceleration, or a vehicle yaw rate being less than a threshold vehicle yaw rate. These screening conditions may indicate that the vehicle 10 is driving in a straight line. The controller 24 may receive the second tire radius estimate, Rs, based on a GPS vehicle speed, a tire angular velocity acquired during the drive cycle, or a tire wheel slip estimate. The GPS vehicle speed may be a vehicle speed output from a GPS module 108 (Haversine Speed).

The GPS learning method may calculate the second tire radius estimate, Rs, based on Equation (4):

$$Rs = \frac{GPSspeed \cdot (s+1)}{\omega s} \quad (4)$$

$\omega_s$ is an angular velocity of at least one of the first tire 60 and second tire 62 of the first wheel assembly 50 and the first tire 70 in the second tire 72 of the second wheel assembly 52. The angular velocity may be provided by a wheel speed sensor 122 disposed proximate the respective tire.

s is a wheel slip estimate of at least one tire calculated based on Equation (5):

$$s(x) = \frac{Tx}{r \cdot F \cdot C(\mu)} \quad (5)$$

$T_x$ is the net wheel torque of at least one tire of the first wheel assembly 50 and the second wheel assembly 52.

r is a nominal tire radius of at least one of the vehicle tires stored in memory.

F is an estimated normal load applied to at least one of the vehicle tires.

C is a longitudinal stiffness of at least one of the vehicle tires as a function of an estimated coefficient of friction of the road surface, μ, and is assumed to be constant.

The GPS vehicle speed may experience delays during vehicle acceleration and deceleration events. The delay may be compensated for by the controller 24 to avoid tire radius estimation error. The delay may be compensated for by implementing an interpolation method between two consecutive speed readings by keeping the previous speed reading from a previous iteration in memory, e.g., EPROM.

The controller 24 may compare the results of the reference tire radius, Rr, the first tire radius estimate, Rf, and the second tire radius estimate, Rs, to each other. The controller 24 may pick at least one of the first tire radius estimate, Rf, and the second tire radius estimate, Rs, based on the maturity of the estimate. A mature estimate may be a tire radius estimate that was taken most recently in time or sampled over longer time periods during the drive cycle. In at least one embodiment, if the first tire radius estimate, Rf, and the second tire radius estimate, Rs, were both applied to the same tire, the first tire radius estimate, Rf, may be fused with the second tire radius estimate, Rs, according to a least-squares method or other statistical method to provide a tire radius estimate, Re, that the controller 24 may be updated with.

The controller 24 may be in communication with a spare tire warning device 132 and may be programmed to transmit an output signal to the spare tire warning device 132 indicating that the spare tire 128 is currently in use. Once it has received the signal from the controller 24, the spare tire warning device 132 may then be configured to issue a warning to a vehicle user that the spare tire 128 is in use. The warning issued to the vehicle user that the spare tire 128 is in use may be visual, audible, or haptic in nature. For example, a visual warning may include a warning light on the dashboard that illuminates when the spare tire 128 is in use, an audible warning may be an alarm that is transmitted audibly through a speaker when the spare tire 128 is in use, and a haptic warning may include a motor located in the steering wheel or vehicle seat that vibrates when the spare tire 128 is in use.

The controller 24 may also be in communication with a spare tire speed limit warning device 134 and may be programmed to transmit an output signal to the spare tire speed limit warning device 134 if the vehicle 10 exceeds a recommended vehicle speed limit when the spare tire 128 is in use. Once it has received the signal from the controller 24, the spare tire speed limit warning device 134 may then issue a warning to a vehicle user that the vehicle speed, Vs, has exceeded the recommended vehicle speed when the spare tire 128 is in use. The warning issued to the vehicle user that the vehicle has exceeded the recommended speed when the spare tire 128 is in use may be visual, audible, or haptic in nature, similar to the examples describe above with respect to the spare tire warning device 132.

The controller 24 may additionally be in communication with a gauge 136 that displays the remaining recommended usage life (or predetermined maximum life span) of the spare tire 128. The controller 24 may be configured to track the usage of the spare tire 128 once it has been determined that the spare tire 128 is in use. The controller 24 may then output a signal to the gauge 136 indicating the remaining recommended usage of the spare tire 128. The gauge 136 may then display the remaining recommended life of the spare tire 128. The gauge 136 may display the remaining life of the spare tire 128 in miles, kilometers, or any other appropriate unit. The gauge 136 may be an analog (e.g., a dial) or digital gauge (e.g., a digital number display). If the gauge 136 is a digital gauge, the gauge may have a color coding indicating that the spare tire is closer to the predetermined maximum lifespan. For example, the gauge may include green, yellow, and red colors that are associated with the remaining life of the spare tire 128, with green indicating little usage of the spare tire 128 and red indicating that the spare tire 128 is close to its maximum recommended use.

Once the spare tire 128 has been used beyond the recommended usage life, the controller 24 may be configured to transmit an output signal to a spare tire over usage warning device 138. Once it has received the signal from the controller 24, the spare tire over usage warning device 138 may then issue a warning to a vehicle user that the spare tire 128 has been used beyond the recommended usage life. The warning issued to the vehicle user that the spare tire 128 has been used beyond its recommended usage life may be visual, audible, or haptic in nature, similar to the examples describe above with respect to the spare tire warning device 132.

Figure 2:
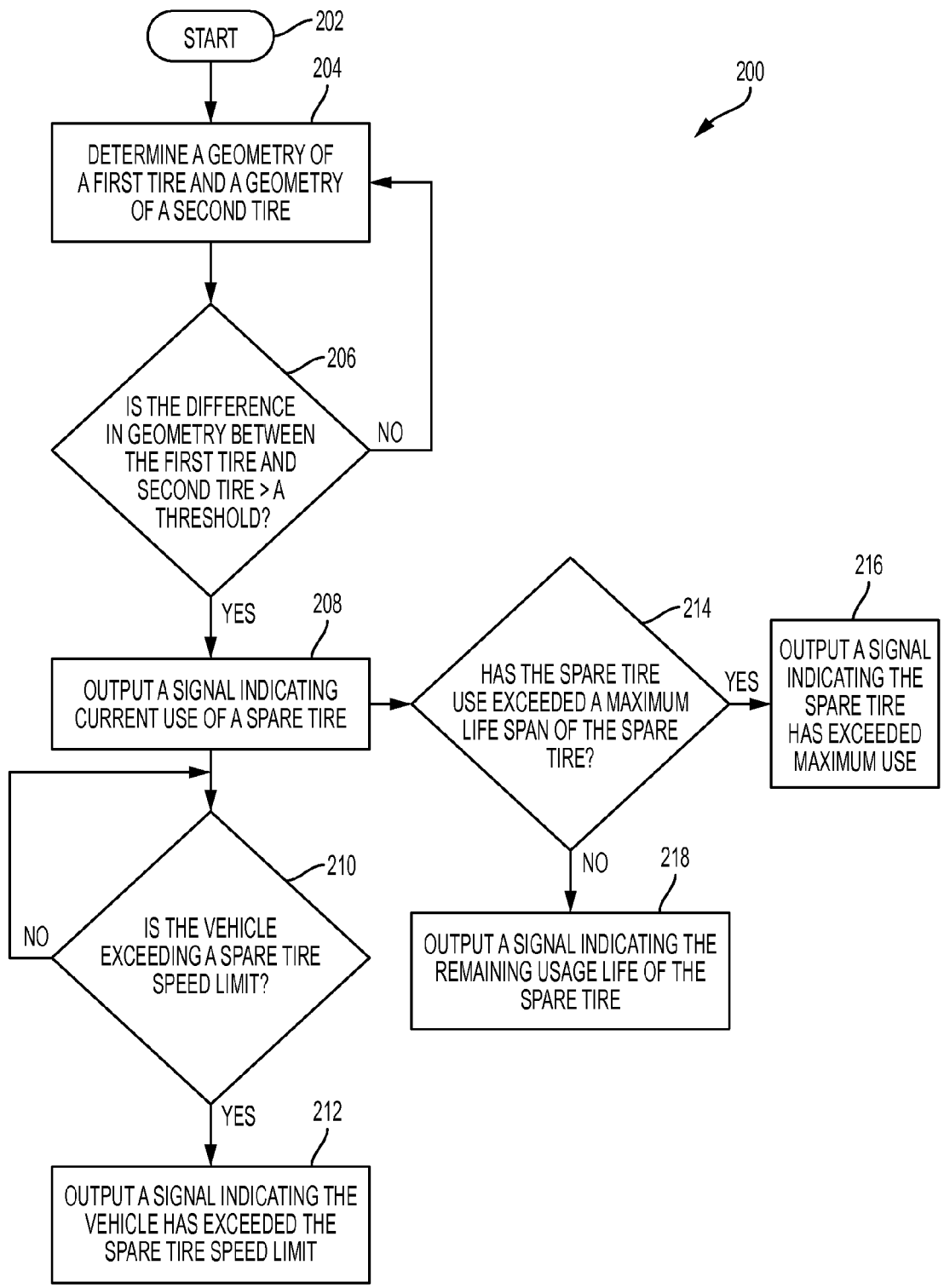
FIG. 2 illustrates a method of monitoring the use of the spare tire.

Referring to FIG. 2, a method 200 of monitoring the use of the spare tire 128 in the vehicle 10 is illustrated. The method 200 is initiated at the start block 202. The method 200 may be initiated by placing a vehicle ignition into an "on" position, placing the vehicle transmission 42 into a specific gear selection, by the vehicle 10 exceeding a predetermined velocity threshold, or by any other appropriate condition such that it is desirable to monitor whether a spare tire is being used.

At step 204 the geometry of a first tire and the geometry of a second tire are determined. The geometry determined at step 204 may include, but is not limited to, tire circumference, tire diameter, tire radius, and tire width. In one embodiment, step 204 may include estimating a radius of the first tire, $R_1$, and a radius of the second tire, $R_2$, utilizing a tire radius estimation method. The tire radius estimation method may include the tire radius estimate methods described above, namely, the yaw rate sensing method, the relative learning method, and the GPS learning method. These methods may be used alone, in various combinations, in series, or in parallel. As already described, these methods may include estimating a tire radius based on a ratio between the radius of the first tire, $R_1$, and the radius of the second tire, $R_2$, an angular velocity of the first tire, $\omega_1$, an angular velocity of the second tire, $\omega_2$, a vehicle yaw rate, $\omega_z$, a vehicle speed, Vs, a vehicle GPS speed (output from the GPS module 108), a wheel slip estimate, and a vehicle track width, Tr (or half-track width, HTr). This disclosure, however, should not be construed as limited to the tire radius estimation methods described herein, but should be construed to include all tire geometry and radius estimation methods known in the field.

At step 206, once the tire geometry of the first tire and the geometry of the second tire have been estimated, the method 200 determines if the difference between the geometry of the first tire and the geometry of the second tire exceeds a threshold at step 206. If the difference between the geometry of the first tire and the geometry the second tire does not exceed the threshold the method 200 returns to step 204. The method 200 may continuously monitor the geometries of the first tire and the second tire at step 204 or there may be a lag in time before the method 200 is reinitiated. The lag in time may correspond to an event such as the vehicle ignition being turned off and once again being placed into an "on" position, the vehicle transmission 42 being placed into a specific gear selection, the vehicle 10 coming to a complete stop before once again being put into motion, etc. If the difference between the geometry of the first tire and the geometry of the second tire does exceed the threshold, the method 200 moves on to step 208 where a signal is generated indicating the use of the spare tire 128. The signal, indicating the use of a spare tire 128, may be an output signal from the controller 24 that is communicated to the spare tire warning device 132 in order to inform a vehicle user that the spare tire 128 is currently in use.

At step 210, once a signal has been output indicating the spare tire 128 is currently in use, the method 200 determines if the vehicle 10 is exceeding a recommended vehicle speed limit while the spare tire 128 is in use. If the vehicle 10 is not exceeding the recommended vehicle speed limit, step 210 will repeat itself as long as the output indicating that the spare tire 128 is currently in use remains. If the vehicle 10 is exceeding the recommended vehicle speed limit while the spare tire 128 is in use the method 200 moves on to step 212 where signal is generated indicating that the vehicle 10 has exceeded the recommended vehicle speed limit while the spare tire 128 is in use. The signal, indicating that the vehicle has exceeded the recommended vehicle speed limit while the spare tire 128 is in use, may be an output signal from the controller 24 that is communicated to the spare tire speed limit warning device 134 in order to inform a vehicle user that this vehicle speed limit has exceeded the recommended vehicle speed limit while the spare tire 128 is in use.

At step 214, once a signal has been output indicating the spare tire 128 is currently in use, the method 200 also determines if the spare tire use has exceeded a recommended usage life (or maximum lifespan) of the spare tire 128. If the recommended usage life of the spare tire 128 has been exceeded the method 200 moves on to step 216 where a signal is generated indicating that the spare tire use has exceeded the recommended usage life of the spare tire 128. The signal, indicating that the spare tire use has exceeded the recommended usage life, may be an output signal from the controller 24 that is communicated to the spare tire over usage warning device 138 in order to inform a vehicle user that the spare tire 128 has been used beyond the maximum recommended use. If the recommended usage life of the spare tire 128 has not been exceeded at step 214, the method 200 moves on to step 218 where a signal is generated indicating the remaining usage life of the spare tire 128. The signal, indicating the remaining usage life of the spare tire 128, may be an output signal from the controller 24 that is communicated to the gauge 136 in order to display the remaining usage life of the spare tire to a vehicle user.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a plurality of tires;
   a spare tire; and
   a controller programmed to, in response to a difference between a radius of a first tire and a radius of a second tire exceeding a threshold, output a signal indicating that the spare tire has replaced one of the plurality of tires.

2. The vehicle of claim 1, wherein the difference between the radius of the first tire and the radius of the second tire is based on a ratio between the radius of the first tire and the radius of the second tire.

3. The vehicle of claim 2, wherein the ratio between the radius of the first tire and the radius of the second tire is based on an angular velocity of the first tire and an angular velocity of the second tire.

4. The vehicle of claim 1, wherein the radius of the first tire and the radius of the second tire are based on a yaw rate of the vehicle.

5. The vehicle of claim 4, wherein the radius of the first tire is also based on an angular velocity of the first tire, an angular velocity of the second tire, a ratio between the radius of the first tire and the radius of the second tire, and a track width of the vehicle.

6. The vehicle of claim 5, where the radius of the second tire is also based on the angular velocity of the first tire, the angular velocity of the second tire, the track width, and the radius of the first tire.

7. The vehicle of claim 1, wherein the radius of the first tire is based on an angular velocity of the first tire and a speed of the vehicle, and the radius of the second tire is based on an angular velocity of the second tire and the speed.

8. The vehicle of claim 7, wherein the speed is output from a GPS module.

9. The vehicle of claim 8, wherein the radius of the first tire is also based on a slip estimate of the first tire, and the radius of the second tire is also based a slip estimate of the second tire.

10. The vehicle of claim 1, further comprising a gauge configured to display a remaining life of the spare tire, and wherein the controller is further programmed to, in response to the signal indicating that the spare tire has replaced one of the plurality of tires, output a signal indicating the remaining life of the spare tire based on a predetermined maximum life span of the spare tire.

11. A spare tire monitoring system comprising:
    a controller programmed to, in response to a difference between a parameter indicative of a geometry of a first tire and a parameter indicative of a geometry of a second tire exceeding a threshold, output a signal indicating that a spare tire is currently being used.

12. The spare tire monitoring system of claim 11, wherein the difference is based on a ratio between a radius of the first tire and a radius of the second tire.

13. The spare tire monitoring system of claim 12, wherein the ratio is based on an angular velocity of the first tire and an angular velocity of the second tire.

14. The spare tire monitoring system of claim 12, wherein the radius of the first tire and the radius of the second tire are based on a vehicle yaw rate.

15. The spare tire monitoring system of claim 14, wherein the radius of the first tire is based on an angular velocity of the first tire, an angular velocity of the second tire, a ratio between the radius of the first tire and the radius of the second tire, and a vehicle track width.

16. The spare tire monitoring system of claim 15, where the radius of the second tire is also based the angular velocity of the first tire, the angular velocity of the second tire, the vehicle track width, and the radius of the first tire.

17. The spare tire monitoring system of claim 12, wherein the radius of the first tire is based on an angular velocity of the first tire and a vehicle speed output from a GPS module, and the radius of the second tire is based on an angular velocity of the second tire and the vehicle speed.

18. The spare tire monitoring system of claim 17, the radius of the first tire is also based on a slip estimate of the first tire, and the radius of the second tire is also based on a slip estimate of the second tire.

19. The spare tire monitoring system of claim 11, further comprising a gauge configured to display a remaining life of the spare tire, and wherein the controller is further programmed to, in response to the signal indicating that the spare tire is currently being used, output a signal indicative of the remaining life of the spare tire based on a predetermined maximum life span of the spare tire.

20. A method of monitoring spare tire use in a vehicle comprising:
   in response to a difference between a radius of a first tire and a radius of a second tire exceeding a threshold, issuing a warning that a spare tire is currently in use and displaying a remaining usage life of the spare tire.

* * * * *